Patented Dec. 22, 1953

2,663,695

UNITED STATES PATENT OFFICE 2,663,695

COATED CALCIUM CARBONATE PARTICLES

John W. Perloff and Larry Jacobson, Painesville, Ohio, assignors to Diamond Alkali Company, Cleveland, Ohio, a corporation of Delaware No Drawing. Application September 12, 1951, Serial No. 246,336

16 Claims. (Cl. 260—23)

This invention relates to improved filling agents for suspensions of polyvinyl resins in a plasticizing agent, which suspensions are known in the art as plastisol and organosol compositions, to the improved plastisols and organosols obtained in combination with said filling agents, and to methods of making the same.

The terms "plastisol" and "organosol" are generally understood in the trade and are used herein for convenience to designate respectively compositions comprising particles of a polyvinyl resin, such as polyvinyl chloride, vinyl chloride-vinyl acetate copolymers, vinyl chloride-vinylidene chloride copolymers, and the like, dispersed in a plasticizer, and compositions comprising particles of a polyvinyl resin of such character dispersed in a plasticizer and a partial solvent for the resin, in which solvent an aromatic hydrocarbon is ordinarily present. In either a plastisol or organosol composition, pigments or fillers, preferably calcium carbonate, may also be present. Processing of the thus-plasticized resin as a film or moldable mass is preferred in certain applications to processing of the combination of resin, plasticizer and pigment by conventional milling. For example, organosol and plastisol type compositions make possible the use of high molecular weight polymers in high solids content mixes used in coatings, both spread and dipped, unsupported films, moldings, and the like. It is not to be understood that in the case of an organosol that solution of the components of the system occurs, but rather that disintegration of the resin particle aggregates and only a solvation, or swelling, of the ultimate resin particles by the partial solvent is effected, whereby the resin may be said to be dispersed in the mixture of partial solvent and plasticizer.

In such compositions, the plasticizing agent employed is generally a material having a low vapor pressure even at relatively high temperatures, and a material in which the resin particles are substantially insoluble at ordinary temperatures but exhibit characteristics of solubility at elevated temperatures, such as temperatures of the order of 300°–350° F. Thus, particles of the resin material may be held in stable suspension in the plastisol or organosol composition until ready for use in molding or coating compositions, whereby heat applied to the plastisol or organosol composition effects the solution and fusion of the resin particles in the plasticizing agent, and a homogeneous plasticized mass of the resin is obtained.

A major problem which has heretofore been present in the art is the effect of incorporating inorganic filler materials, such as natural or precipitated calcium carbonates, with plastisol or organosol compositions, as the addition of such inorganic fillers invariably results in a substantial increase in the viscosity of the plastisol or organosol to a point where the composition becomes unworkable in coating, molding, and extruding operations.

It has now been found that highly-filled organosol or plastisol compositions may be formulated without the attendant increase in viscosity of the composition, and that a characteristic lowered viscosity may be maintained over extended periods of time of storage of the composition.

One of the objects of the present invention is to provide improved filling agents for plastisol and organosol compositions.

Another of the objects of the present invention is to provide plastisol and organosol compositions containing a relatively large amount of inorganic filler materials, which compositions do not exhibit an initial high viscosity.

Still another of the objects of the invention is to provide a method for preparing such highly-filled plastisol and organosol compositions, whereby the necessity for ball milling or grinding the inorganic filler materials into the plastisol and organosol compositions is eliminated.

These and other objects will be apparent from the description of the invention hereinafter.

In accordance with these objects, the present invention includes the improved filling agents, the improved plastisol and organosol compositions containing the improved filling agents, and methods of making the same. Thus, the compositions contemplated include particles of a polyvinyl resin selected from the group consisting of polyvinyl chloride, vinyl chloride-vinyl acetate copolymers, and vinyl chloride-vinylidene chloride copolymers, dispersed in a liquid vehicle chosen from the group consisting of a plasticizer for said resin and a mixture of a plasticizer for said resin with a partial solvent for said resin, comminuted calcium carbonate particles coated with chlorinated paraffin wax having a chlorine content substantially within the range of 35%–70% of chemically combined chlorine, and a substance selected from the group consisting of rosin, and fatty acids and fatty acid esters having a saponification number substantially within the range of 150–200.

The invention also includes the method of making such plastisol and organosol compositions and the aforesaid improved filler materials by a series of steps which include coating particles of calcium carbonate with 0.5%–6% of its weight of a mixture of a chlorinated paraffin wax containing from 35%–70% of chemically combined chlorine, and a substance chosen from the group consisting of rosin, and fatty acids and fatty acid esters having a saponification number substantially within the range of 150–200, adding the coated particles to a suspension of particles of a resin chosen from the group consisting of polyvinyl chloride, vinyl chloride-vinyl acetate copolymers, and vinyl chloride-vinylidene chloride copolymers in a liquid vehicle chosen from the group consisting of a plasticizer for said resin and a mixture of a plasticizer for said resin with a partial solvent for said resin, and agitating the composition thus obtained until a uniform dispersion of said resin particles and said coated calcium carbonate particles in said vehicle is attained.

In formulating the compositions of the present invention, a filler comprising calcium carbonate, such as ground limestone, ground marble, ground oyster shells, and the like, preferably having an average particle size within the range of 1–25 microns, is dry mixed, for example, in a ball mill, with 0.5%–6% of its weight of a mixture of a chlorinated paraffin wax containing from 35%–70% of chemically combined chlorine and a substance chosen from the group consisting of rosin, and fatty acids and fatty acid esters having a saponification number within the range of 150–200. The purpose of the dry mixing of the filler material with a mixture of chlorinated paraffin wax and the rosin or fatty material is to obtain an adsorbed layer of organic material on the surfaces of the particles of the filler.

The effectiveness of the mixing or ball milling operation in coating the particles of the dry filler material may be measured by the oil absorption value, i. e. the amount of a vegetable oil required to provide sufficient cohesion to permit pelletizing the mass. When the oil absorption values for a series of samples thus taken show a substantially constant minimum value for successive samples, the coating of the filler particles with the mixture of chlorinated paraffin wax and rosin or fatty material is substantially complete, and the mixing or ball milling operation may be suspended. For example, it has been found in the course of experimentation in accordance with the method of the present invention, that a precipitated calcium carbonate having an average particle size within the range of 1–25 microns is effectively coated for the purposes of the present invention with a mixture of 1% of soybean oil and 1% of a chlorinated paraffin wax containing 40% of chemically combined chlorine, within a period of 1½ to 2 hours in a ball mill.

In addition to the chlorinated paraffin wax and rosin employed in formulating the compositions of the present invention, fatty acids and fatty acid esters having a saponification value within the above-noted range, which have been found suitable for the purposes herein, include castor oil, tall oil, cottonseed oil, stearic acid, soybean oil, and the like.

The coated particles of the calcium carbonate may be combined with a suspension of the resin particles in the plastisol or organosol compositions merely by stirring, as in a paddle-type stirrer, or in a kneading-type mixer, such as a Day mixer, or, if desired, on a three-roll paint mill. Ball milling, while not necessary to effect uniform dispersion of the coated filler material, may be resorted to where other means of mixing or milling are not available.

The choice of a plasticizer employed in the compositions of the present invention depends in part upon the physical properties desired in the finished plastic article and in part upon the physical properties of the plasticizer itself. In general, the plasticizers commonly used in formulating plastisols and organosols are suitable for the purposes herein. Such plasticizers include esters of an inorganic acid, such as tricresyl phosphate, esters of dibasic organic acids, such as diactylphthalate, di-capryl phthalate, di-butyl sebacate, di-ethylhexyl adipate, and the like. This listing of specific plasticizers is, of course, only exemplary since many others which are effective in the compositions of the present invention will occur to those skilled in the art.

In the organosol type formulation, a partial solvent which swells the resin particles, aids disintegrating resin particle aggregates, and is a suspension medium for the resin, is employed in addition to the plasticizer for the resin material. Such partial solvents are ordinarily a non-polar-polar combination, the non-polar portion including an aromatic hydrocarbon, such as benzene, toluene, xylene, and the like, and an aliphatic hydrocarbon type solvent, such as mineral spirits; the polar portion includes a solvent preferably of the ketone type, such as acetone, methyl ethyl ketone, methyl isobutyl ketone, cyclohexanone, and the like. Otherwise, the formulation and the method of preparing an organosol are identical with that above described for the preparation of plastisol compositions.

In order that those skilled in the art may better understand the present invention and in what manner the same may be carried into effect, the following specific examples are offered:

In the following examples, for the sake of consistency, the resinous material, the plasticizer, and the inorganic filler material, with which the compositions of the present invention are formulated, are identical throughout.

*Example I*

Three 100-gram portions of precipitated calcium carbonate having an average particle size within the range of 1–15 microns are ball milled with the following ingredients:

1. 1 gm. commercial, ground rosin.
2. 1 gm. commercial rosin, 1 gm. chlorinated paraffin wax containing 40% of chemically combined chlorine.
3. 1 gm. tall oil, 1 gm. chlorinated paraffin wax containing 40% of chemically combined chlorine.

The precipitated calcium carbonate and organic acidic material are ball milled until the oil absorption as described hereinabove become constant, which in these instances occurs within a matter of 1½–2 hours.

*Example II*

A plastisol is prepared by grinding 300 parts of vinyl chloride resin in the form of a fine powder with 240 parts of di-octylphthalate. 100 parts of each of the portions of coated precipitated calcium carbonate as described in Example I above are combined with 180 parts of the plastisol described in the forepart of this example, and the mixture thus obtained stirred with a paddle-type stirrer until a uniform dispersion of the inorganic material and the plastisol is obtained. The viscosities of the filled plastisol compositions described above are given in the table below, the numbers at the heading of the table corresponding to the numbers given in Example I above for the various modifications of the coating of the precipitated calcium carbonate particles.

| Composition number | Viscosities, centipoises ×10⁻³ | | |
|---|---|---|---|
| | 1 | 2 | 3 |
| Time: | | | |
| Initial | 60 | 36 | 9 |
| 24 hours | 58 | 29 | 9.5 |
| 1 week | 74 | 42 | 15 |
| 2 weeks | 70 | 43 | 15 |
| 3 weeks | | | 13 |
| 6 weeks | | | 13 |

Example III

Five plastisol compositions are made up in the same manner as that described in Example II, using 100 parts of polyvinyl chloride resin powder and 80 parts of di-octylphthalate for each. To each of these compositions there are added 100 parts of precipitated calcium carbonate having an average particle size within the range of 1–15 microns and which have previously been ball milled with the substances and in the amounts given in the upper part of the table below. Ball milling of the calcium carbonate and organic material is carried out to a substantially constant minimum oil absorption value. The viscosities of the filled plastisol compositions, initially and after the designated periods of aging, are given in the lower part of the table:

| Composition number | 1 | 2 | 3 | 4 | 5 |
|---|---|---|---|---|---|
| Plastisol | 180 | 180 | 180 | 180 | 180 |
| Filler: Precipitated CaCO₃ ball milled with ¹— | | | | | |
| 1% rosin and 1% chlorinated paraffin wax, 40% Cl | 100 | | | | |
| 1% rosin and 5% chlorinated paraffin wax, 70% Cl | | 100 | | | |
| 1% cottonseed oil, 1% chlorinated paraffin wax, 40% Cl | | | 100 | | |
| 1% tall oil (1 hr.) and then 1% chlorinated paraffin wax, 40% Cl to finish | | | | 100 | |
| 0.5% cottonseed oil, 0.5% chlorinated paraffin wax, 40% Cl | | | | | 100 |
| | Viscosities, centipoises ×10⁻³ | | | | |
| Time: | | | | | |
| Initial | 24 | 24 | 12 | 7 | 13 |
| 48 hours | 30 | 28 | 15 | 12 | 17 |
| 3 weeks | 41 | 34 | 19 | 16 | 23 |
| 6 weeks | 40 | 33 | 19 | 16 | 21 |

¹ The percentages of the various organic materials are based on the weight of the CaCO₃ alone and not on the total weight of the mixture of CaCO₃ and organic material.

Example IV

Five plastisol compositions are prepared in the same manner and with the same amounts of ingredients as that described in Example III above. Precipitated calcium carbonate having an average particle size within the range of 1–15 microns is coated with the substances indicated in the table below by the technique employed in Example I. The compositions and the viscosity values given in the table are for purposes of comparison with the table of Example III, particularly to point out the effect of a mixture of chlorinated paraffin wax containing from 40%–70% of chemically combined chlorine and a fatty material as a coating for the particles of calcium carbonate in filled plastisol compositions:

| Composition number | 1 | 2 | 3 | 4 | 5 |
|---|---|---|---|---|---|
| Plastisol | 180 | 180 | 180 | 180 | 180 |
| Filler: Precipitated CaCO₃ ball milled with ¹— | | | | | |
| 1% soybean oil, 1% chlorinated paraffin wax, 40% Cl | 100 | | | | |
| 1% cottonseed oil | | 100 | | | |
| 1% chlorinated paraffin wax, 40% Cl | | | 100 | | |
| 1% tall oil (1 hr.) and then 1% chlorinated paraffin wax, 40% Cl to finish | | | | 100 | |
| 1% chlorinated paraffin wax, 40% Cl, (1 hr.) and then 1% tall oil to finish | | | | | 100 |
| | Viscosities, centipoises ×10⁻³ | | | | |
| Time: | | | | | |
| Initial | 18 | 15 | 25 | 10 | 10 |
| 48 hours | 24 | 22 | 43 | | |
| 3 weeks | 34 | 29 | 70 | 16 | 17 |

¹ The percentages of the various organic materials are based on the weight of the CaCO₃ alone and not on the total weight of the mixture of CaCO₃ and organic material.

Example V

Three organosol compositions are prepared by dispersing 100 parts of polyvinyl chloride resin powder in 67 parts of di-octylphthalate, containing 2 parts of organic phosphate stabilizer for the vinyl chloride resin, and 48 parts of a solvent consisting of 45% xylol, 45% mineral spirits, and 10% methyl isobutyl ketone. The organosols thus prepared are combined with the following ingredients:

1. 100 parts of precipitated CaCO₃ having an average particle size within the range of 1–15 microns.
2. 100 parts of precipitated CaCO₃ (as above) which has been previously ball milled with a mixture of 1% of its weight of cottonseed oil and 1% of its weight of chlorinated paraffin wax containing 40% of chemically combined chlorine.
3. 100 parts of precipitated CaCO₃ (as above) which has been previously ground with a mixture of 1% of its weight of tall oil and 1% of its weight of chlorinated paraffin wax containing 40% of chemically combined chlorine.

The initial viscosities of the above formulated organosol compositions are:

| Composition number | Viscosities, centipoises ×10⁻³ |
|---|---|
| 1 | 15.4 |
| 2 | 5.3 |
| 3 | 5.9 |

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter consisting essentially of particles of: (1) a vinyl resin selected from the group consisting of polyvinyl chloride, vinyl chloride-vinyl acetate copolymers, and vinyl chloride-vinylidene chloride copolymers; (2) a comminuted inorganic filler material selected from the group consisting of natural and precipitated calcium carbonates, the particles of said filler material being coated with a mixture of a chlorinated paraffin wax having a chemically combined chlorine content substantially within the range of 35%–70%, and a substance selected from the group consisting of rosin, and fatty acids and fatty acid esters having a saponification number substantially within the range of 150–200; and a liquid vehicle chosen from the group consisting of a plasticizer for said resin and a mixture of a plasticizer for said resin with a partial solvent for said resin.

2. The composition of claim 1 in which said vinyl resin constitutes 30%–40% of the total composition, said inorganic filler material constitutes 30%–40% of the total composition, and the coating material for said inorganic filler material constitutes 0.5%–6% of the weight thereof.

3. The composition of claim 2 in which said liquid vehicle consists of a plasticizer for said vinyl resin.

4. The composition of claim 2 in which said liquid vehicle comprises a plasticizer and a partial solvent for said vinyl resin.

5. The method of making a plasticized vinyl resin composition which includes the steps of: (1) dispersing a vinyl resin selected from the group consisting of polyvinyl chloride, vinyl chloride-vinyl acetate copolymers, and vinyl chloride-vinylidene chloride copolymers, in a liquid vehicle chosen from the group consisting of a plasticizer for said vinyl resin and a mixture of a plasticizer for said resin with a partial solvent for said resin; (2) coating the particles of a comminuted inorganic filler material selected from the group consisting of natural and precipitated calcium carbonates with a combination of chlorinated paraffin wax containing from 35%–70% of chemically combined chlorine, and a substance selected from the group consisting of rosin, and fatty acids and fatty acid esters having a saponification number substantially within the range of 150–200; and (3) mixing the dispersion of said vinyl resin and said coated inorganic filler particles with agitation until a uniform flowable dispersion of said resin particles and said inorganic filler particles is obtained.

6. The method of claim 5 in which said vinyl resin constitutes 30%–40% of the finished composition, said comminuted inorganic filler material constitutes 30%–40% of said finished composition, and the coating substances for said inorganic filler particles constitute 0.5%–6% of the weight of said filler particles.

7. The method of claim 6 in which the particles of said comminuted inorganic filler material are coated by ball milling a mixture of said filler material, said chlorinated paraffin wax, and a substance selected from said group until the oil absorption value of the mixture reaches a substantially constant minimum.

8. The method of claim 6 in which the particles of said comminuted inorganic filler material are coated with a combination of chlorinated paraffin wax containing from 35%–70% of chemically combined chlorine and rosin.

9. The method of claim 6 in which the particles of said comminuted inorganic filler material are coated with a combination of chlorinated paraffin wax containing from 35%–70% of chemically combined chlorine and cottonseed oil.

10. The method of claim 6 in which the particles of said comminuted inorganic filler material are coated with a combination of chlorinated paraffin wax containing from 35%–70% of chemically combined chlorine and tall oil.

11. An improved inorganic filler material for use in organosol and plastisol compositions, consisting essentially of particles of an inorganic material selected from the group consisting of natural and precipitated calcium carbonates having a relatively uniformly adsorbed organic coating consisting essentially of a combination of chlorinated paraffin wax containing from 35%–70% of chemically combined chlorine with a substance selected from the group consisting of rosin, and fatty acids and fatty acid esters having a saponification number substantially within the range of 150–200, said coating amounting to 0.5%–6% of the weight of said inorganic material.

12. The composition of claim 11 in which said adsorbed organic coating consists of a mixture of said chlorinated paraffin wax and tall oil.

13. The composition of claim 11 in which said adsorbed organic coating consists essentially of a mixture of said chlorinated paraffin wax and rosin.

14. The composition of claim 11 in which said adsorbed organic coating consists essentially of a mixture of said chlorinated paraffin wax and cottonseed oil.

15. The method of making an improved inorganic filler material for organosol and plastisol compositions, which includes the steps of agitating a mixture of a comminuted inorganic material selected from the group consisting of natural and precipitated calcium carbonates and an organic coating material therefor consisting essentially of chlorinated paraffin wax containing from 35%–70% of chemically combined chlorine and a substance selected from the group consisting of rosin, and fatty acids and fatty acid esters having a saponification number substantially within the range of 150–200, and continuing the agitation of said mixture until the oil absorption thereof reaches a substantially constant minimum.

16. The method of claim 15 in which said organic coating material amounts to 0.5%–6% of the weight of said inorganic material.

JOHN W. PERLOFF.
LARRY JACOBSON.

References Cited in the file of this patent

UNITED STATES PATENTS

| Number | Name | Date |
|---|---|---|
| 2,436,216 | Leathernan | Feb. 17, 1948 |
| 2,453,052 | Van Etten | Nov. 2, 1948 |